(12) United States Patent
Murray et al.

(10) Patent No.: US 7,992,089 B2
(45) Date of Patent: Aug. 2, 2011

(54) VISUALIZATION OF MEETING INVITEE STATUS AS A METHOD OF COLLABORATION

(75) Inventors: Adam T. Murray, Winchester (GB); David Screen, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/021,874

(22) Filed: Jan. 29, 2008

(65) Prior Publication Data

US 2009/0193341 A1      Jul. 30, 2009

(51) Int. Cl.
*G06F 3/00* (2006.01)
(52) U.S. Cl. ......... 715/753; 715/751; 715/758; 709/204
(58) Field of Classification Search .................. 715/751, 715/753, 758; 709/204
See application file for complete search history.

(56) References Cited

U.S. PATENT DOCUMENTS

| | | | |
|---|---|---|---|
| 5,093,901 A * | 3/1992 | Cree et al. ..................... 715/753 |
| 5,365,360 A | 11/1994 | Torres | |
| 6,085,166 A * | 7/2000 | Beckhardt et al. ................. 705/9 |
| 6,732,103 B1 * | 5/2004 | Strick et al. ............................ 1/1 |
| 6,993,325 B1 | 1/2006 | Waesterlid | |
| 7,693,736 B1 * | 4/2010 | Chu et al. ........................... 705/9 |
| 2003/0004773 A1 * | 1/2003 | Clark et al. ......................... 705/8 |
| 2003/0204474 A1 * | 10/2003 | Capek et al. ..................... 705/64 |
| 2003/0210073 A1 | 11/2003 | Ngai et al. | |
| 2004/0044681 A1 * | 3/2004 | Brady et al. .................. 707/102 |
| 2004/0122681 A1 | 6/2004 | Ruvolo et al. | |
| 2005/0034079 A1 * | 2/2005 | Gunasekar et al. ........... 715/753 |
| 2005/0120052 A1 * | 6/2005 | Miller et al. ................. 707/104.1 |
| 2005/0125246 A1 * | 6/2005 | Muller et al. ........................ 705/1 |
| 2005/0171830 A1 * | 8/2005 | Miller et al. ....................... 705/8 |
| 2005/0216842 A1 * | 9/2005 | Keohane et al. ............... 715/733 |
| 2005/0262164 A1 * | 11/2005 | Guiheneuf et al. ........... 707/203 |
| 2006/0047816 A1 * | 3/2006 | Lawton et al. ................. 709/227 |
| 2006/0074932 A1 * | 4/2006 | Fong et al. ..................... 707/100 |
| 2006/0212330 A1 * | 9/2006 | Savilampi ........................ 705/8 |
| 2006/0271624 A1 * | 11/2006 | Lyle et al. ..................... 709/204 |
| 2007/0106725 A1 * | 5/2007 | Starr et al. .................... 709/204 |
| 2007/0250366 A1 * | 10/2007 | Nurmi .............................. 705/8 |
| 2007/0250641 A1 * | 10/2007 | Flannery et al. .............. 709/243 |
| 2007/0260686 A1 * | 11/2007 | Frydenlund et al. .......... 709/204 |
| 2008/0071868 A1 * | 3/2008 | Arenburg et al. ............. 709/206 |

(Continued)

OTHER PUBLICATIONS

Alex Ivanov et al., "The Plot-poll: A Collaborative Knowledge Visualization and Polling Tool for an Online Discussion Board", 2005 AIGA.

*Primary Examiner* — Tuyetlien T Tran
(74) *Attorney, Agent, or Firm* — Scully, Scott, Murphy & Presser, P.C.; Dermott Cooke, Esq.

(57) ABSTRACT

A system, method, and computer program product provide visualization of anonymous information about overall meeting invitation status. An attribute is generated for display at an invitee device and the attribute in a displayed image represents a person's decision: accept, decline, or tentative. Each decision is displayed by different color, attribute shape and/or display orientation. For example, an individual acceptance will be displayed as a small red square in the display image. An individual decline will be displayed as a small green square in the display image. An individual tentative decision will be displayed as a small yellow square in the display image.

7 Claims, 3 Drawing Sheets

NO ONE ACCEPTING

SUPPORT GROWS

DEVELOPMENT OTHERS FOLLOW!

U.S. PATENT DOCUMENTS

| | | |
|---|---|---|
| 2008/0162247 A1* | 7/2008 | Hurmola et al. .................. 705/9 |
| 2008/0195312 A1* | 8/2008 | Aaron et al. .................. 701/209 |
| 2009/0006972 A1* | 1/2009 | Karlson et al. ................. 715/737 |
| 2009/0024439 A1* | 1/2009 | Ryan et al. ....................... 705/9 |
| 2009/0055236 A1* | 2/2009 | O'Sullivan et al. ............... 705/8 |
| 2009/0063993 A1* | 3/2009 | Nyamgondalu ............... 715/752 |
| 2009/0083112 A1* | 3/2009 | Bhogal et al. ..................... 705/9 |
| 2009/0100347 A1* | 4/2009 | Schemers et al. ............. 715/751 |

* cited by examiner

VISUALIZATION OF MEETING INVITEE STATUS AS A METHOD OF COLLABORATION

BACKGROUND OF THE INVENTION

1. Fields of the Invention

The present invention relates to visualization tools generally, and more particularly, to a visualization tool for providing indications of user invitation status for on-line events such as collaborations, meetings, etc.

2. Description of the Prior Art

Using client-server email/collaboration software, for example Lotus Notes ®, a user (the organizer) can schedule a meeting/event which appears in the calendar of other users. When the meeting is scheduled, invitations are sent to the potential attendees and the recipient has the choice of, for example in Lotus Notes ®: accept, decline, tentatively accept, delegate or propose a new time.

Based on the number of responses that an organizer receives, the organizer may decide to confirm or cancel the meeting depending on likely attendance. Spaces for the meeting may be on a first-come-first-served basis and so later acceptances may get rejected.

There are the following problems and deficiencies with this system:

a. Organizer does not know status until enough people have responded.
b. Attendees can not view individual status of other attendees.
c. Attendees might want to get a feeling of whether the event is going to be popular enough but not too overbooked.
d. An attendee may want to find out if colleagues or friends are going. For example someone who is perceived to be important may improve the event. One might want to meet with a particular social group. Attendance of a particular work team might increase the success of the event.
e. In practice, people who know each other find a time to informally talk, make their decision and then commit electronically. This does not work so well for more distributed or less informal groups, if there is no direct means of discussion.

Therefore, it would be desirable to provide an apparatus for providing a visualization of meeting invitation status that addresses the aforementioned deficiencies.

SUMMARY OF THE INVENTION

The above disadvantages or drawbacks have been eliminated by the present invention, which includes a method for generating a display image to indicate a meeting acceptance status for on-line users invited to a meeting, comprising:

a) sending, via a communication link, two or more invitations of the meeting to respective two or more invitees for the meeting;

b) receiving, at a host device, respective responses associated with each of the two or more invitees, each the responses indicating a decline or acceptance attendance status of each respective invitee;

c) processing, at the host device, the received responses and generating a display representing anonymous information about overall invitation status of at least each the respective responding invitees, the display having one or more portions, each portion having one or more display attributes, each attribute representing information concerning the meeting and indicating a current overall invitation status; and d) communicating the generated display to each of the two or more and other invitees via an on-line display device associated with each invitee.

According to the present invention, a user sends an email indicating "yes" (or using the "accept meeting" feature on calendar server—that in effect would usually be sending an email or communicating to the calendar server) and then other invitees will see generated anonymous information about overall invitation status. Anonymous data is provided pertaining to invitees and their overall status without linking personal details to the information. Overall means the entire collection of the anonymous data. Therefore it may be possible to visualize that 10 people from Department A, 3 people from Department B and 2 people from Management have accepted the meeting invite without divulging who the people are. This could persuade a potential invitee from Department A as it could indicate relevance to their job role and conversely dissuade an invitee from Management as they can see there will already be Management presence.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
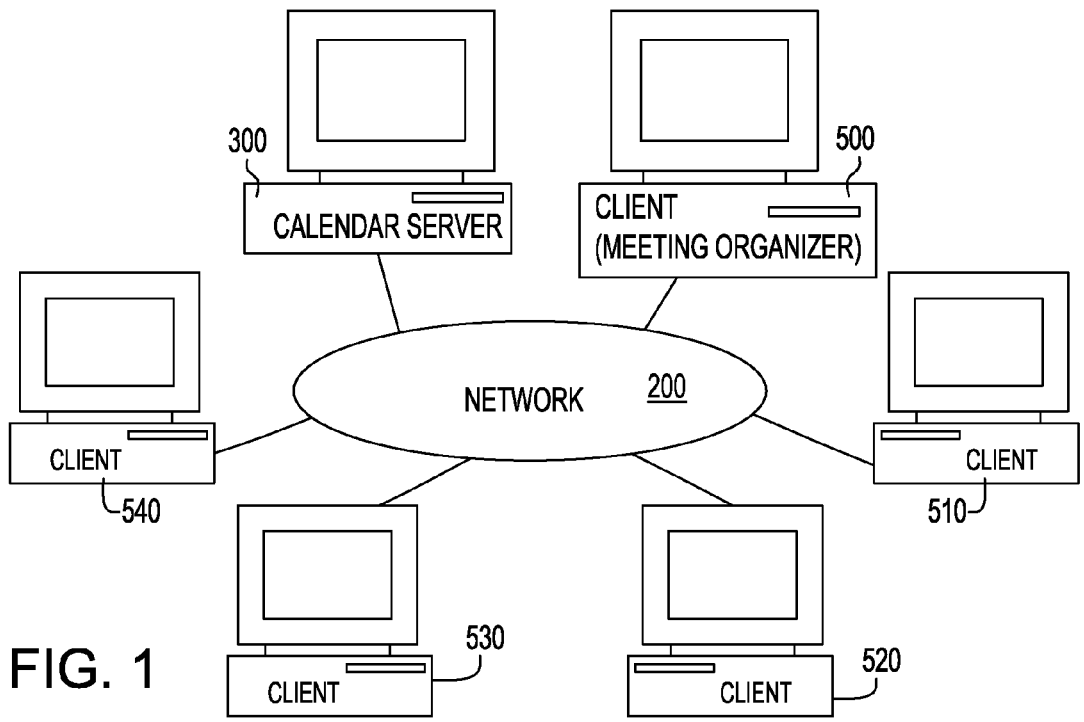
FIG. 1 depicts a system diagram of the present invention.

Reference now had to FIG. 1, which depicts the computing environment in which the visualization method of the invention is employed. A Calendar server or like computing device 300 (e.g. Lotus Domino ®), a mail client/email/calendar client 500 (e.g. Lotus Notes ®) used by a meeting organizer, and multiple client computer devices 510-540 are connected through a network such as Internet, wireless Internet, TCP/IP, LAN, wireless LAN, etc. The operation of FIG. 1 is described below with FIG. 2, which depicts a flow chart of the methodology employed by the present invention.

Figure 2:
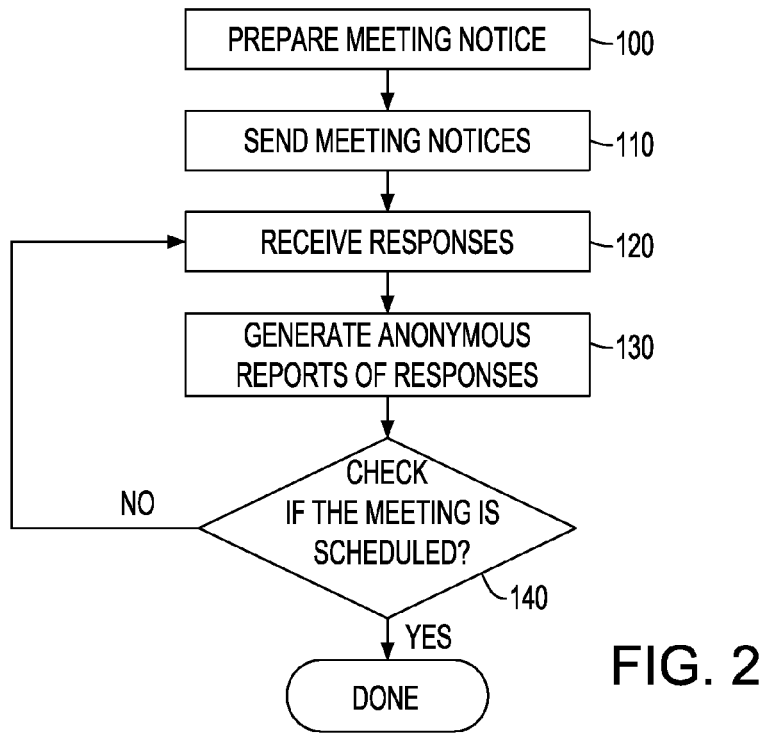
FIG. 2 depicts a flow chart of the present invention.

At step 100 in FIG. 2, a meeting organizer 500 prepares a meeting notice with a calendar server 300. At step 110, the calendar server 300 sends the meeting notices to potential meeting participants by an electronic medium, e.g., email. At step 120, the meeting participants send responses on-line, via computing clients, (e.g., clients 510-540) until the meeting is scheduled. The meeting responses are collected by the calendar server 300 and functionality is implemented for providing on-line attendance status. For example, at step 130, the calendar server 300 generates anonymous reports of responses, makes available them with meeting notices, and notifies meeting participants of the reports. The anonymous reports may include figures where the number of meeting acceptance is indicated, statistics which informs who are meeting participants, e.g., the most popular job title of those who accepted the meeting, and/or visual images representing meeting acceptances being color-coded, for example, and where a horizontal and vertical position relates to a participant's geographical location, job function, or department. In one embodiment, the calendar server 300 provides the anonymous reports including the statistics through a non-visual method such as a web page and an email. At step 140, the calendar server 300 checks if the meeting is scheduled. Steps 120 to 140 are repeated until the meeting is scheduled.

Figure 3:
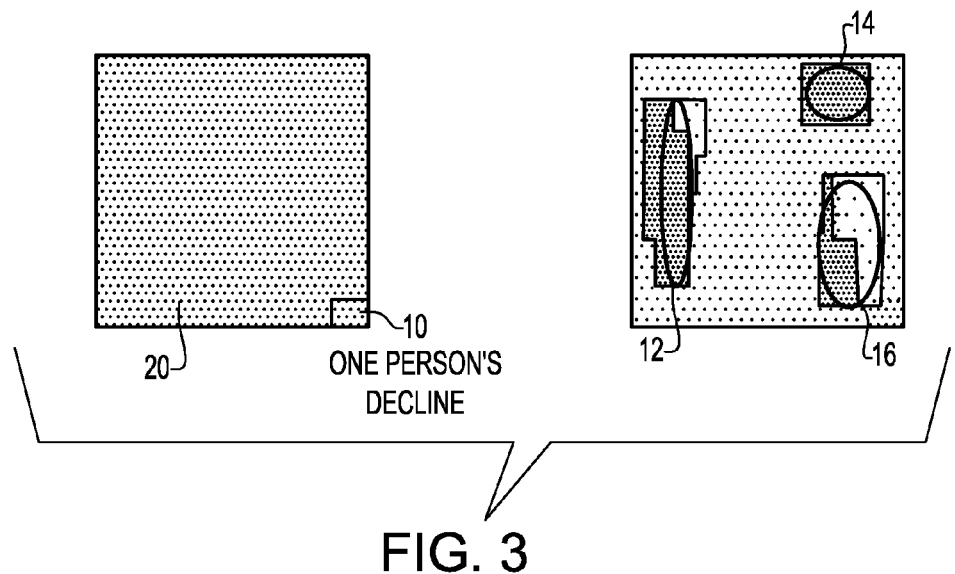
FIG. 3 depicts an embodiment of the present invention.

Reference is now had to FIG. 3, which depicts an exemplary client display interface device including a display interface for displaying on-line meeting status information as generated by the calendar server 300 at step 130. As shown in FIG. 3 via a generated example interface 20, a small square 10 represents an attribute associated with a person's response and indicates a status of the response for the attribute. An gray color attribute, for example, may represent a "decline" status, a light gray color attribute, for example, may represent a "tentative" status as shown 16 in FIG. 3, and a dark gray color attribute, for example, may represent an "accept" status as shown in 12 and 14 in FIG. 3. It is understood that other colors including depth and shading other than gray, light gray, and dark gray can be used to represent an attribute, which indicates a status of a response. Moreover, the attribute may comprise other shapes, e.g., circle, rectangle, triangle, or other geometric shapes, besides the square shown in FIG. 3 and further, may be oriented vertically or horizontally in the display to depict a current invitee status.

Figure 4:
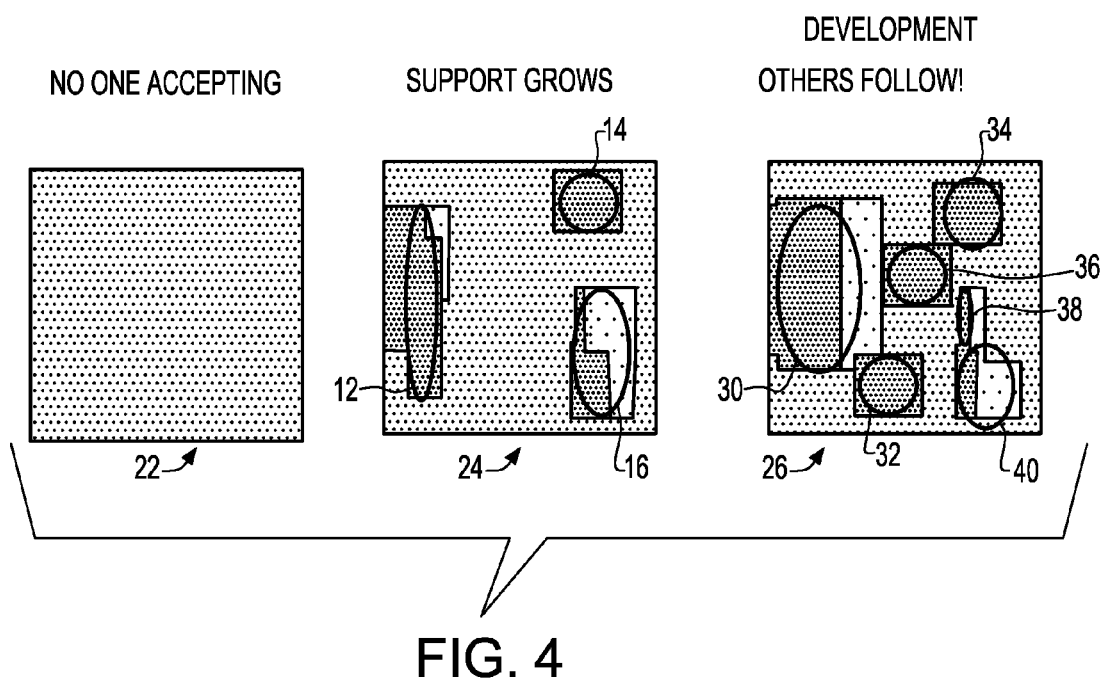
FIG. 4 depicts changes of a display image, as a meeting is getting popular, according to the present invention.

The advantage of the present invention is that, over time, a client display interface can actually indicate to users that a scheduled meeting is getting more popular by providing a color-coded display indicating increased interest in the meeting. The display interface 22 in FIG. 4 shows an initial condition of a scheduled on-line meeting invitation status. As shown at 24 in FIG. 2, as acceptance grows, it motivates others to accept. At the display interface 24, there are provided two acceptance areas (12 and 14) and one tentative area (16) in the display image. As others accept, as shown at the display interface 26, the number of acceptance areas has increased to four (30, 32, 34, and 36) as indicated and the number of tentative areas has increased to two (38 and 40). Potential attendees see, via their display interface, anonymous attribute data, but the meeting host or organizer still can access the fall set of replies.

Another embodiment of the present invention is that "acceptance" isn't a binary or tertiary concept but a percentage, e.g. 0% is total decline/not interested and 100% is total acceptance/very interested. This embodiment is sufficient for large numbers of people deciding on an issue or social events, for example.

Figure 5:
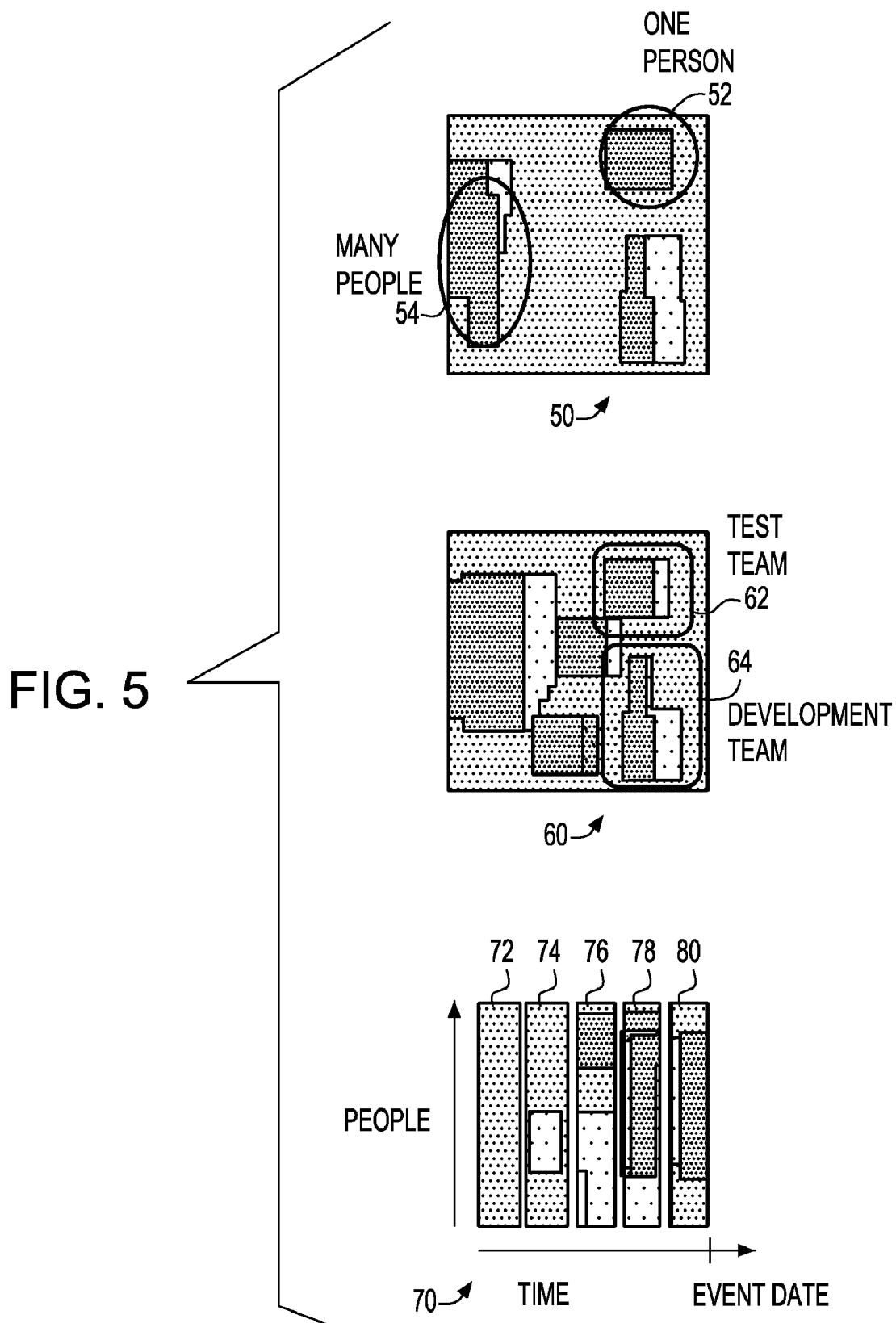
FIG. 5 depicts other embodiments of the present invention.

In one embodiment of the present invention, a person can have a large weighting to indicate an important person attending. For example, at display interface 50 in FIG. 5, attribute indicator 52 represents one person's attribute of acceptance. Attribute indicator 54 shows other people's attributes of acceptance collectively. The squares or the like defined attribute shape can be organized into areas to represent teams. For example, at the display interface 60 in FIG. 5, an attribute area 62 represents a test team and the test team's anonymous attribute data. An attribute area 64 represents a development team, for example. The display interface 70 in FIG. 5 indicates, for a user, status change over time, each status at a point in time can be represented in a vertical strip as like strip 72, 74, 76, 78, and 80. The strips 72, 74, 76, 78 and 80 for various time points can be successively provided next to each other via a client display interface to indicate invitee status and attendance attribute of a team, an individual, or anonymous entity over time.

Generating a colored display interface at calendar server 300 is straightforward. For example, a pie-chart in Microsoft ® Excel ® can be an example of this. A method for a more complete implementation where acceptance are grouped would be:

1. Divide the acceptance into segments or groups, e.g., by departments in a company, by job titles, by ranks, or by geography of each participant. For example, if a meeting was for sales, development, and marketing and there were 100 invitees from sales, 50 invitees from development, and 50 invitees from marketing, then there would be 3 segments: one segment, which covers 50% image area, for sales and two segments, which each covers 25% image area, for development and marketing.

2. Divide each image area into sub-image area representing each participant and color according to acceptance value (e.g., green=0%/decline, yellow=50%/tentative, red=100%/accept). Plotting acceptances in a sorted order make for a more informative display.

The extra/enhanced information can be generated through collection and manipulation of the invite responses. By applying certain rule sets to the information provided in the response, it is possible to visualize areas through a client display interface. Then, the information can be presented back to the attendee anonymously. In addition, a calendar server within in an organization can look up meeting invite information regarding attendees, e.g., job roles and department information, from an internal directory server. Hence, in another embodiment, the present invention can provide extra information to meeting attendees via display attributes, while keeping the information anonymous. The information can be based on a. current status of replies
b. popularity of previous occurrences of the meeting if it is a repeated meeting
c. attendance of previous meetings by the organizer/speaker
d. a user's previous attendance of meetings
e. who went to previous meetings that a user went to.

A meeting that may have been overlooked might get flagged as interesting to the user, because the current attendees are a similar profile or group with whom they usually attend events with.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention.

Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A method for generating a display image to indicate a meeting acceptance status for on-line users invited to a meeting, comprising:
   a) sending, via a communication link, two or more invitations of said meeting to respective two or more invitees for said meeting;
   b) receiving, at a host device, respective responses associated with each of said two or more invitees, each said responses indicating a decline or acceptance attendance status of each respective invitee;
   c) processing, at said host device, said received responses and generating a display representing anonymous information about overall invitation status of at least each said respective responding invitees, said display having one or more portions, each portion having one or more display attributes, each attribute representing information concerning said meeting and indicating a current overall invitation status; and
   d) communicating said generated display to each of said two or more and other invitees via an on-line display device associated with each invitee;
   wherein a display attribute represents importance of an attendee, said host device providing a weighting such that a display attribute representing more important attendees as shown in a displayed image portion is larger than corresponding display attributes of other attendees.

2. The method according to claim 1, wherein said host device provides statistics to inform invitees who are attending said meeting through a non-visual method, said statistics include one or more of: meeting acceptance data, meeting attendees' geographic locations, job role information, and department information.

3. The method according to claim 1, wherein a display attribute represents one or more of: an attendee's geographic location, job function within an organization or a department within an organization.

4. The method according to claim 1, wherein a display attribute is a displayed shape having a particular horizontal or vertical orientation in a display portion to indicate a current invitation status.

5. The method according to claim 1, wherein a display attribute is a displayed color, said color having a particular depth or shading to indicate a current invitation status.

6. The method according to claim 1, farther comprising:
   e) updating said display attributes, as more invitees respond, said updated display attributes indicating more planned attendance to said meeting.

7. A program storage device readable by machine, tangibly embodying a program of instructions executable by the machine to perform method steps for generating an image to indicate a meeting acceptance status, said method steps comprising the steps of claim 1.

* * * * *